March 8, 1955    G. H. HANSSON    2,703,526
RECIPROCATORY FEED MEANS FOR ROTARY PRINTING MACHINES
Filed Feb. 15, 1951    9 Sheets-Sheet 1

Fig. 1.

INVENTOR
GUSTAV HUGO HANSSON
BY Robert E. Burns
ATTORNEY

March 8, 1955   G. H. HANSSON   2,703,526
RECIPROCATORY FEED MEANS FOR ROTARY PRINTING MACHINES
Filed Feb. 15, 1951   9 Sheets-Sheet 5

Fig. 5.

INVENTOR
GUSTAV HUGO HANSSON
BY *Robert E. Burns*
ATTORNEY

March 8, 1955 G. H. HANSSON 2,703,526
RECIPROCATORY FEED MEANS FOR ROTARY PRINTING MACHINES
Filed Feb. 15, 1951 9 Sheets-Sheet 8

INVENTOR
GUSTAV HUGO HANSSON
BY Robert E. Burns
ATTORNEY

March 8, 1955  G. H. HANSSON  2,703,526
RECIPROCATORY FEED MEANS FOR ROTARY PRINTING MACHINES
Filed Feb. 15, 1951  9 Sheets-Sheet 9

Fig. 9.

INVENTOR
GUSTAV HUGO HANSSON
BY
ATTORNEY

United States Patent Office 2,703,526
Patented Mar. 8, 1955

2,703,526

RECIPROCATORY FEED MEANS FOR ROTARY PRINTING MACHINES

Gustav Hugo Hansson, Goteborg, Sweden, assignor to Aktiebolaget Hedemora Verkstader, Hedemora, Sweden, a company of Sweden Application February 15, 1951, Serial No. 211,027

9 Claims. (Cl. 101—232)

The present invention relates to reciprocatory feed means for rotary printing machines, such as offset printing machines, and more particularly to the paper transport mechanisms in such machines and also to two-speed gearings suitable for such mechanisms of reciprocating type.

It is the object of the invention to provide a printing machine that works quickly and paper transport means which are simple in construction and safe and reliable in function. A further object is to provide means that operate very accurately with regard to the positioning of the paper relative to the printing means and release smoothly the paper from the printing cylinder, A still further object is to provide reciprocating gripper means which advance the paper at a velocity adequate to the printing operation and after releasing the paper return at an increased speed to fetch another paper. It is also an object that the means for advancing the paper shall operate even if the print should have voids or blank intervals in the peripheral direction, in which case the automatic feed produced by the printing cylinders themselves will usually not work on account of the reduction in pressure between the cylinders.

For obtaining these and other objects that will be evident to those skilled in the art the present printing machine comprises printing and impression cylinders having working surfaces only along a portion of their peripheries, the remaining portions having reduced radius so as periodically to form a relatively spacious free gap between the cylinders permitting gripper members to pass therethrough, either reciprocatingly or continuously, in order to seize a paper sheet to be printed, forcibly pull it during the printing operation proper, remove it from contact with the cylinders to a delivery place, and after releasing the printed paper return to seize another sheet. For the reciprocating movement of the grippers certain means have been invented as will be explained hereinbelow and pointed out in the appended claims.

For a better understanding of the invention reference will now be made to the drawings illustrating embodiments of the invention, which, however, is not restricted thereto.

In the drawings:

Fig. 9 illustrates diagrammatically a continuous performance of the paper transport means according to the invention.

Figure 1:
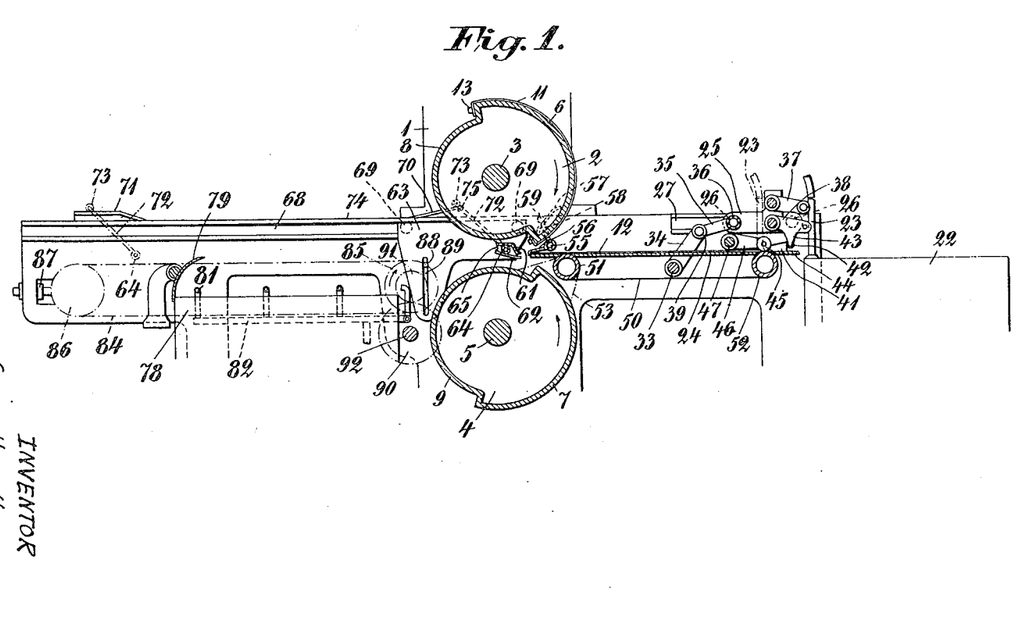
Figs. 1 and 2 are a side elevation and a plane view, respectively, of pertinent parts of a printing machine embodying the invention.
Figure 2:
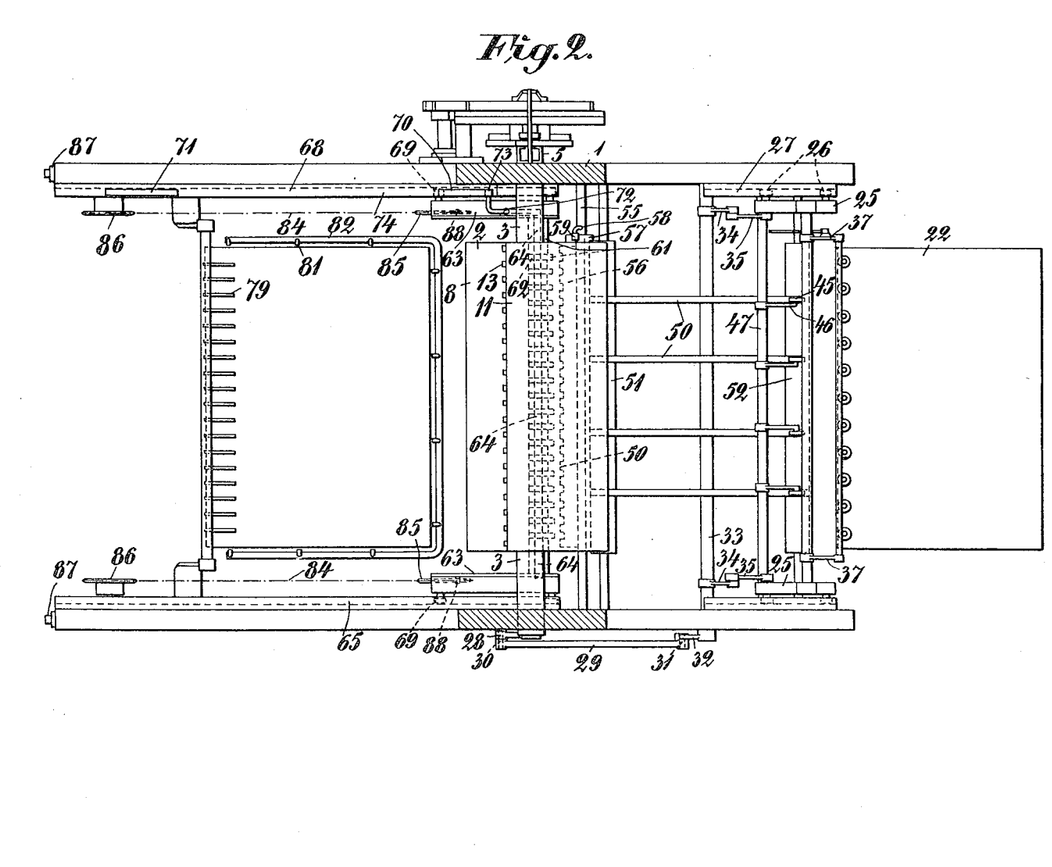

Referring first to Figs. 1 and 2 numeral 2 indicates a transfer or offset cylinder mounted on shaft 3 which is journalled in the standard of the machine. Below and in printing relationship to said cylinder the impression cylinder 4 is mounted on shaft 5, which is also journalled in standard 1. Both cylinders have peripherally restricted working surfaces 6 and 7, respectively, the remaining portions having depressed surfaces 8 and 9, respectively. The working or printing surface 6 of the offset cylinder is covered by the printing blanket 11, which is usually made of rubber and is secured to the cylinder by bolts 13. The working or impression surface 7 of the impression cylinder corresponds to said blanket so that the printing operation can take place in the usual manner when the cylinders rotate in opposite directions so as to form an inlet side where the cylinders approach during rotation and an outlet side where they leave each other. The depressed surfaces or portions 8 and 9 of the cylinders register so that a relatively ample free gap will be formed between the cylinders periodically during rotation.

Although cylinder 2 has been and will be described as an offset cylinder supposed to cooperate in conventional manner with a printing plate cylinder and an inking system, not shown, the invention comprises also the case where cylinder 2 is a direct printing cylinder.

Cylinders 2 and 4 are equal in radius, at least for the working surfaces, but it is possible to use a greater impression cylinder having two or more impression surfaces separated by equally many depressed portions, provided that the angular speed of the impression cylinder is reduced so that the working and depressed surfaces of cylinder 2 will upon rotation cooperate in series with each of the working and depressed surfaces of cylinder 4.

The paper 12 to be printed is fed to the inlet side of the cylinders in any conventional manner and there will now be described means which may be useful in most cases.

Papers to be printed are piled in conventional manner in a pile 22 on a table with automatic feed, not shown, and suction nozzles 23 take the uppermost paper from the pile and move it to the feed board 24 (omitted in Fig. 2) by means of a lifting mechanism comprising a carriage 25 sliding by means of rollers 26 in a guide 27. The carriage 25 is moved to and fro in this guide by a crank arm 28 secured to shaft 5 of the impression cylinder. At the end of arm 28 the connection arm 29 is rotatably mounted on a pin 30. Arm 29 is rotatably connected also to a second crank arm 32 by means of pin 31 and crank arm 32 is keyed to shaft 33 which obtains an oscillating movement upon rotation of shaft 5. Secured to the oscillating shaft 33 crank arm 34 moves the carriage 25 to and fro by the aid of link 35 rotatably connected to arm 34 by pin 39 and to the carriage by pin 36. The suction nozzles 23 are mounted to the carriage 25 by two arms 37 and 38 which are journalled in parallel so as to warrant a translatory movement of the nozzles. The nozzles are moved horizontally by the carriage 25 and vertically by cam 41 cooperating with a roller 42 mounted on a nose 43 on arm 38. The cam 41 is so shaped as quickly to lift the nozzles over the end board 44 and slowly to sink them between the paper forwarding rolls 45 mounted on arms 46 movable about a shaft 47. Endless feed bands 50 run over rolls 51 and 52, the former driven by a chain 53 and a chain wheel on shaft 5, not shown. The bands 50 are supported by the feed board 24 and the rollers 45 run on the rolls 52 under the intermediation of said bands so that the paper forwarded by the nozzles 23 in between the rollers 45 and the bands 50 (as indicated by the dot-and-dashed nozzle 23) will be advanced by the bands to the inlet of the cylinders, where stopper fingers 56 pivoted on a shaft 55 limit the movement of the paper 12. The movements of the nozzles 23 and the bands 50 are so adjusted as to deliver the paper to the inlet side a few moments before the working surfaces 6 and 7 of the cylinders will meet, and the fingers 56, normally lifted so as to give free admittance to the paper feed, are just before the moment when the working surfaces approach urged downwards by the arm 58 having a roller 59 running on a cam 57 on the offset cylinder.

For the further transport of the paper sheet a reciprocating gripper mechanism is provided. A gripper comprises a stationary upper jaw 61 secured to two carriages 63, one at each end of the cylinders, and lower movable jaws 62 secured to a shaft 64 rotatably mounted in the carriages 63. The jaws 62 are urged by springs 65 in a direction to close the mouth of the jaws 61 and 62. The carriages 63 run in guides 68 by means of rollers 69.

The gripper shaft 64 has an arm 72 at the extreme end carrying a roller 73 adapted to roll on guide rail 74. The grippers are operated by sloping lifter cams 70 at the place of seizing the paper between the cylinders and 71 at the place of delivery of the printed paper the cams 70 and 71 being connected to said rail 74 at a distance from each other corresponding to the length of transport of the paper by means of the gripper, that is to say corresponding to at least the peripheral length of the printing surface 6 of the offset cylinder 2 and, preferably, at least said peripheral length plus the radius of the impression surface 7, so as to bring the printed paper completely out of the sphere of the cylinders before releasing it. The lifting cam 70 is so positioned as to open the gripper just before the latter reaches the paper 12 held by the stopper fingers 56 and the upper end of the cam is so positioned that the roller 73 will fall down into the rail 74 and so permit spring 65 to close the gripper about the paper between the fingers 56 which will in this moment be lifted by means of cam 57. The carriage is arranged at this moment to advance towards the delivery end and the roller 73 will roll on rail 74 below cam 70 which is rotatable about pin 75 and will thereby be lifted by the roller. As will be explained more in detail hereinbelow the drive of the carriage 63 is so arranged as to advance the carriage and the grippers at exactly the same speed as the peripheral speed of the printing surface 6 so that the paper will be pulled all the time and be released from the printing surface to which it will usually stick more or less. By these means a perfect transport of the paper will also be warranted even in case the printing blanket 11 should exhibit peripheral intervals between print-portions.

When the grippers have advanced near to the delivery table, not shown, carrying the pile 78 of printed papers the roller 73 ascends cam 71 and the gripper jaws are opened to release the printed paper, which is caught by guide fingers 79.

The gripper is so constructed that the mouth thereof in closed position is located in a horizontal plane at a level not higher than about 10 millimeters or about the thickness of the lower jaw 62 above the lowermost portion of the parts of the gripper arrangement passing over the pile 78 or, which is usually practically the same, in between the cylinders. By this arrangement no downwardly projecting portions of the returning grippers will come into contact with the paper just released and falling down upon the delivery pile.

In order further to eliminate the risk of the grippers contacting with the released paper suction nozzles 81, branched off from a suction pipe 82, are arranged about the upper edge of the delivery pile so as to promote the falling of the paper by establishing a slight vacuum below the paper.

When the grippers have released the paper they must return to fetch another paper, but this must take place while that gap still prevails which was formed between the cylinders immediately after the paper just released left the printing surface 6 and therefore the return velocity must be far greater than the advance velocity. In the illustrated embodiment the carriage is driven by two endless chains 84 running on chain wheels 85 and 86 at either side of the machine, the wheel 86 being provided with stretching arrangement 87. The chains have each a carrier pin 88 adapted to engage a vertical slot 89 in each carriage 63. When rotating the chains, by the aid of carrier pins 88, pull the carriages 63 to and fro and the drive for the chain is arranged for two speeds timed to the above requirements of advancing velocity and higher return velocity. Some means for obtaining such two velocities particularly suited for the present purpose have been invented and will be described but it is believed that the new structures will be useful also in other connections. These means may be substituted by other two-speed transmissions known in the art, such as sun and planet gears. If desired, the carriage could be provided with a horizontal longitudinal rack cooperating with a gear transmission arranged for reciprocating movement or with a gear segment oscillating about a shaft under the influence of a cam mounted on, for instance, the shaft of one of the cylinders 2 and 4. These and many other adequate means will not be illustrated since the skilled mechanic will have no difficulty in constructing them.

Figure 3:
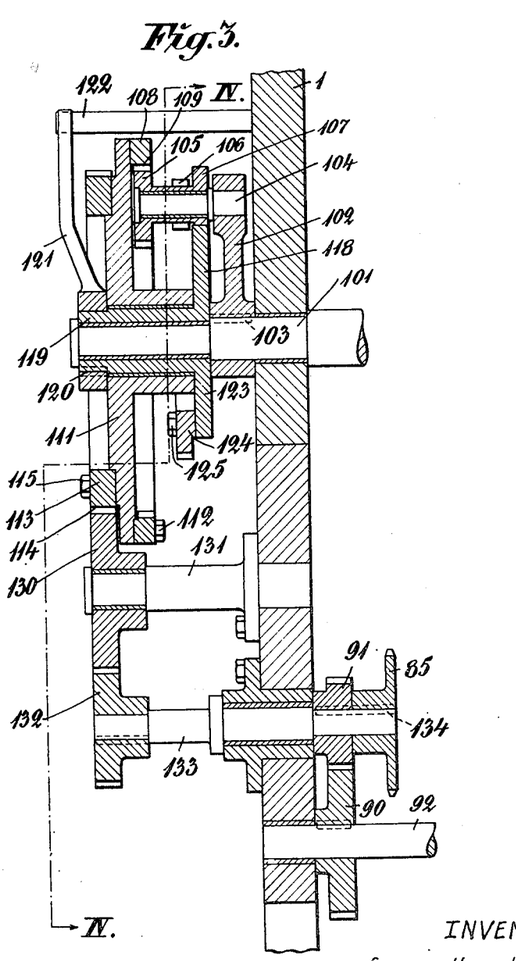
Fig. 3 is a composition of successive longitudinal cross-sectional view of a two-speed gearing according to the invention and Fig. 4 is a side view of same parts being broken away for better illustrating other parts.
Figure 4:
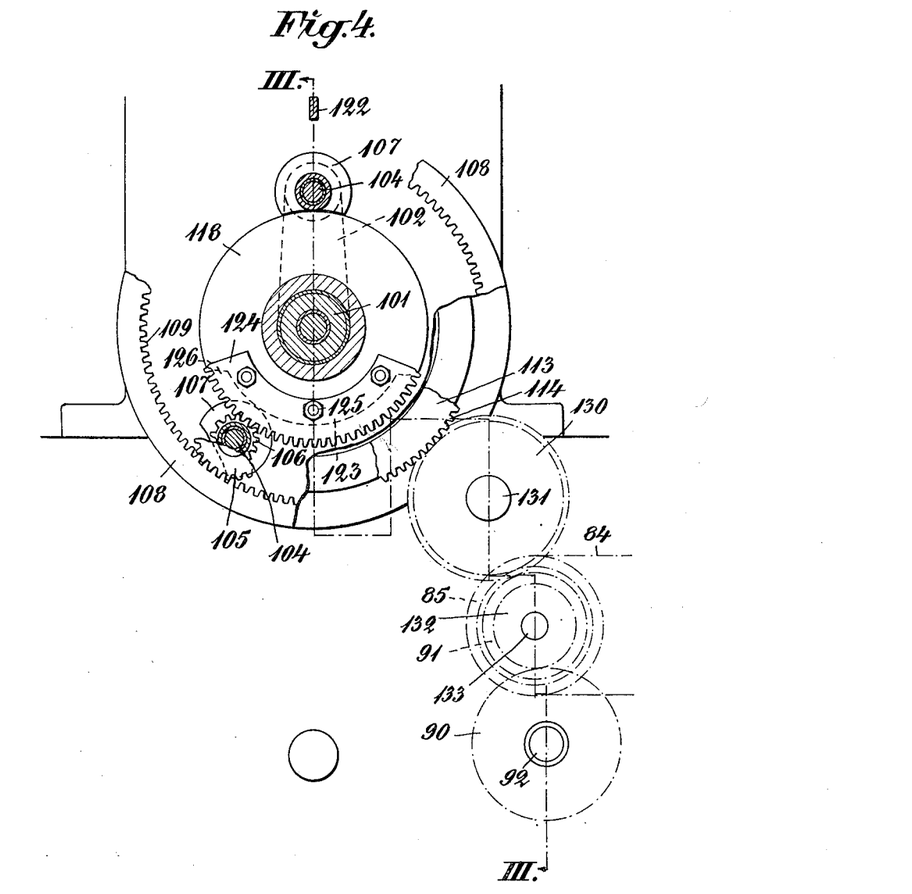

One gearing for two alternating speeds is illustrated in Figs. 3 and 4. On a driving shaft 101, which in this case is preferably identical with the cylinder shaft 5, an arm 102 is secured by key 103. The arm carries a pin 104 in parallel to shaft 101. On this pin are rotatably mounted a planetary cog wheel 105, a driver cog wheel 106 and an arresting disc 107 all connected irrotatably with each other. Planetary wheel 105 is in engagement with a cog ring 108 having internal cogs 109. The cog ring is secured by bolts 112 to a wheel or disc 111 rotatable about shaft 101. A cog ring 113 with external cogs 114 is also secured to wheel 111 by means of bolts 115. The cog ring 113 delivers the two alternating speeds as will be explained presently.

The arresting disc 107 is adapted with a circular engagement surface to cooperate with a stationary circular cam segment 118 secured to a sleeve 119 mounted on shaft 101. An arm 121 is secured by key 120 to sleeve 119, said arm being connected to a strong spring 122 secured to standard 1. To a flange 123 on sleeve 119 is also secured a cog segment 124 by means of bolts 125. This cog segment 124 is arranged along the circular path of the driver cog wheel 106 so as to engage the latter in periods when arm 102 rotates wheel 106 past segment 124 thereby causing wheel 106 to rotate about pin 104 and consequently planetary wheel 105 to rotate and drive cog ring 108. During this rotation the arresting disc 107 must obviously be released from engagement with cam 118 so as to be able to rotate with wheels 105 and 106 as will be best seen from Fig. 4, which shows the disc 107 in two positions, the one in engagement with cam 118 and the other released with driver wheel 106 in engagement with cog segment 124.

In operation shaft 101 is driven at constant speed by any convenient source, preferably in response to the rotation of the printing cylinders, and causes the pin 104 to rotate planetary about shaft 101. As long as arresting disc 107 engages cam 118 as is the case in the position shown in Fig. 3 and in the upper position in Fig. 4 the cog wheel 105 is fixed relative to pin 104 and forces cog rings 108 and 113 to rotate with the same angular speed as shaft 101. When, however, disc 107 has reached the end of the circular cam 118 the cog segment 124 will engage and rotate driver wheel 106 and thereby rotate planetary wheel 105 which will now not only carry cog ring 108 along as when disc 107 engaged cam 118 but further drive the cog ring by rotation so that the ring 108 will thereby obtain an increased speed although the driving shaft 101 is still rotating at its original constant speed. It will be seen from Fig. 4 that flange 123 has a shorter radius than cam segment 118 providing a free space 126 in which the arresting disc 107 can rotate. The stationary members 118 and 124 being attached to standard 1 by the resilient member 122 the shock when driver wheel 106 engages cog segment 124 will be absorbed.

The two speeds of cog ring 113 thus obtained will be transferred to an intermediary cog wheel 130 mounted on stud 131 and from there to gear 132 keyed to shaft 133 to which chain wheel 85 is keyed by key 134 which also secures cog wheel 91 to the shaft. In engagement with wheel 91 is another cog wheel 90 keyed to shaft 91 which traverses the printing machine to the opposite standard, where corresponding cog wheels 90 and 91 and chain wheel 85 are arranged for driving the carriage 63 on that side.

Figure 5:
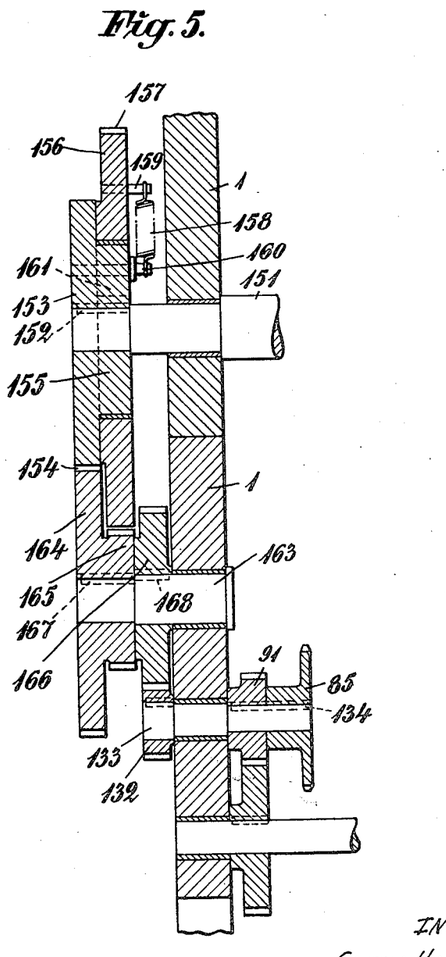
Figs. 5 and 6 are views similar to Figs. 3 and 4, respectively, of another two-speed gearing.
Figure 6:
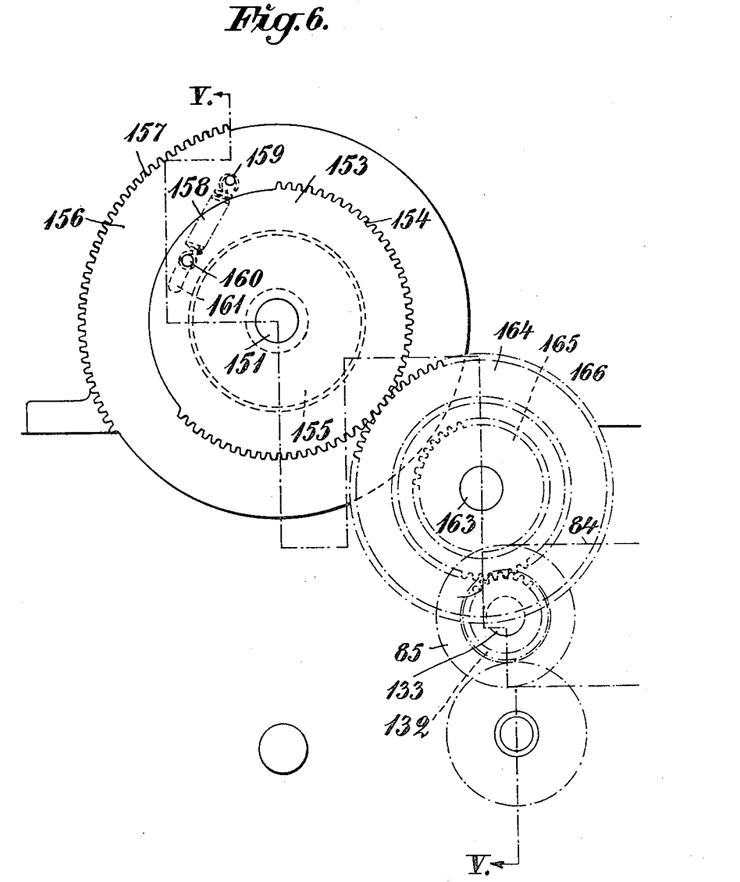

The alternative gearing for two alternating speeds illustrated in Figs. 5 and 6 is based upon the principle of couples of cylindric gears of different diameters. In the standard 1 is mounted the driving shaft 151 running with constant speed. By key 152 the disc wheel 153 is secured to shaft 151. Wheel 153 has a cog sector 154 and a conaxial cylindric disc 155. A greater disc ring 156 is rotatably mounted on disc 155 and is provided with a cog sector 157 opposite to cog sector 154. Disc ring 156 is fixed to disc 155 by a spring 158 secured to pin 159 of disc ring 156 and pin 160 of disc 155 so as to permit a slight rotary movement of the disc 156 relative to disc 153. Thereby the alternating engagements of cog sectors 154 and 157 with cooperating cog wheels will become smooth and shocks be absorbed. On a shaft 163 journalled in standard 1 are cog wheels 164 and 165 as well as 166 secured by keys 167 and 168, respectively. Cog wheel 164 is arranged to engage cog sector 154 of disc 153 and cog wheel 165 to engage sector 157 of disc ring 156 alternatingly. The gearing ratio of the couple 156/165 being greater than that of the couple 153/164 cog wheel 166 will deliver the greater speed in the first instance.

In engagement with cog wheel 166 is gear 132 keyed to shaft 133 journalled in standard 1. Shaft 133 also carries chain wheel 85 and cog wheel 91 secured to the shaft by key 134. Cog wheel 91 transfers the movement to the chain wheel 85 on opposite side of the machine as described above.

Figure 7:
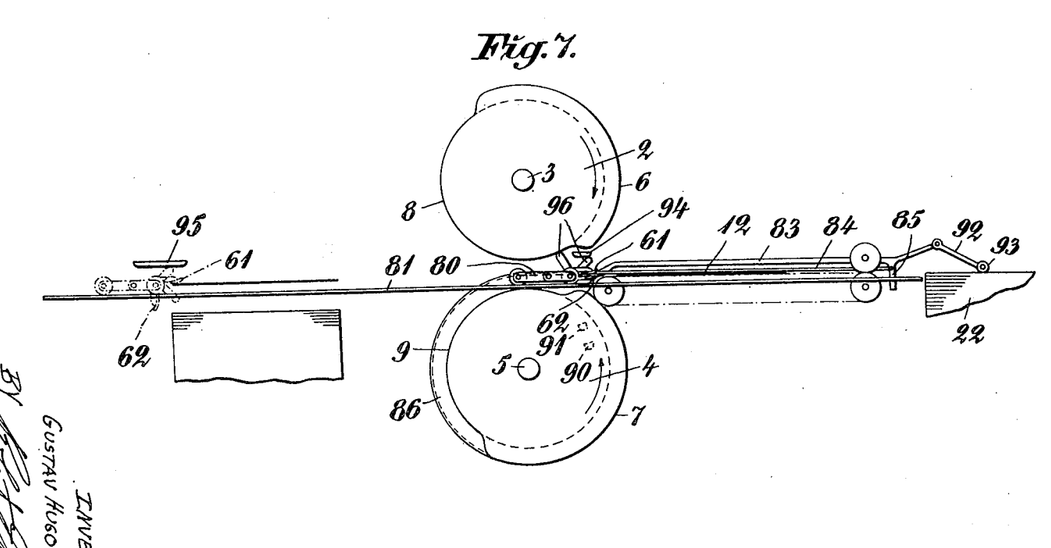
Figs. 7 and 8 are diagrammatical views, similar to Figs. 1 and 2, of a modified machine comprising a wire and spring two-speed arrangement.
Figure 8:
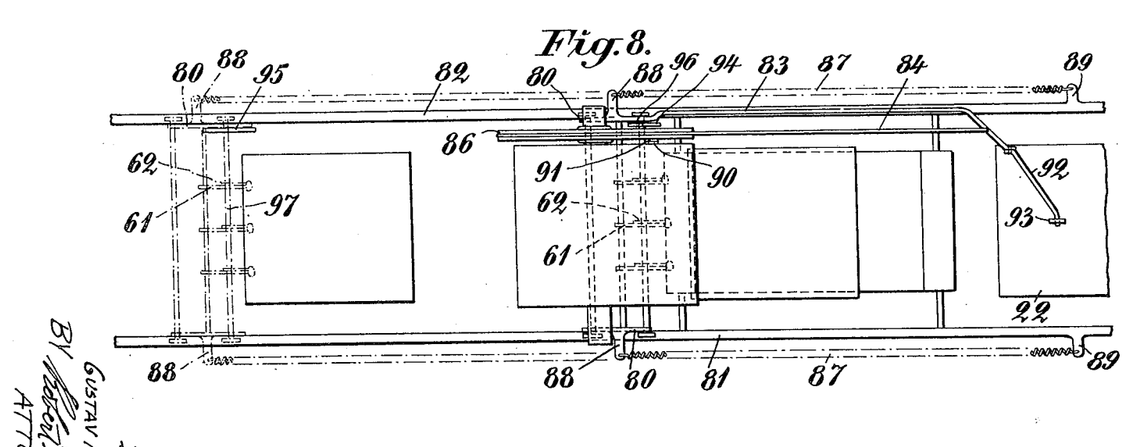

A further reciprocating type of feeding mechanism embodying the inventional features is illustrated diagrammatically in Figs. 7 and 8, conventional elements being omitted as well understood by those skilled in the art. As described with reference to Figs. 1 and 2 also this machine has printing and impression cylinders 2 and 4 provided with cooperating working surfaces 6 and 7, respectively, comprising approximately half the circumference of the respective cylinder, the other halves 8 and 9, respectively, having reduced diameters so as to form periodically the gap between the cylinders upon rotation of the later ones in the direction of the arrows.

Arranged to pass into this gap during the period it prevails the grippers 61, 62 are secured to two carriages 80 running on rails 81 and 82 mounted in parallel in the standards of the machine, not shown, outside the ends of the cylinders so as to permit the latter ones to operate in the space between the rails. Analogously with the embodiment described above the grippers are arranged to seize the sheet at the inlet side of the cylinders and pull it between the cylinders in contact with and at the same speed as the printing surface 6 and release it at the outlet pile as soon as the carriage 80 will have advanced so far that the sheet is out of contact with the cylinders. The carriage will then be returned at a velocity much greater than the advancing speed. For this purpose the following mechanism will be used.

On the carriage 80 running on rail 82 a rod 83 is secured to extend rearwardly. A wire 84 is secured with its one end to a nose 85 at the extreme of this rod and with its other end to the periphery of a pulley 86 loosely journalled on shaft 5 of the impression cylinder 4. The radius of the pulley is approximately equal to the radius of the printing surface 6 minus the radius of wire 84 so as to compensate for the thickness of this wire. Such compensation may be obtained also by adjusting the fixing point of wire 84 on nose 85 vertically. Obviously this pulley can be mounted as well as on shaft 3 of the printing cylinder. The carriages 80 are also provided with springs 87 secured to arms 88 on the carriages and to projecting arms 89 on the rails on the feeding side of the cylinders. The spring tends to urge the carriages and grippers towards the feeding side. For actuating the pulley 86 a carrier 90 is resiliently projecting from the cylinder 4 to engage an abutment 91 on the pulley just when the carriage is to be advanced to apply the sheet 12 of paper in correct position with regard to the printing surface 6. By the rotation of cylinder 4 and consequently of pulley 86 the wire is wound on to the latter warranting a velocity of the paper equal to that of the printing surface 6. After the carriage has reached its extreme advanced position and shall be returned the carrier 90 is disengaged from abutment 91 and releases the pulley. The carriages 80 will then be returned by the action of springs 87 tensioned at the advance of the carriages. Simultaneously the rod 83 will be returned, wire 84 unwound and, thereby, the pulley rotated backwards to the starting position, ready for a new cycle.

At the extreme end of rod 83 a paper feed arm 92 projects rearwardly. Pivoted at the end of this arm is a rubber treaded friction feed roller 93 which is rotatable in only one direction, permitting it to roll on the paper pile 22 on the return movement of rod 83 and, unrotatable, to forward the uppermost paper sheet from the pile when the rod advances. The sheet so forwarded is fed to the grippers as described with reference to Figs. 1 and 2.

For closing and opening the grippers any convenient mechanism known in the art can be used. Important is, however, that the mechanism is made to seize at the inlet side of the cylinders and leave off at a place where the sheet is well out of the cylinders, diagrammatically shown by abutments 94 and 95, respectively, cooperating with arms 96 on the shaft 97 upon which the lower gripper members 62 are secured, so as to open the grippers when arms 96 turn shaft 97.

As diagrammatically illustrated in Fig. 9 the present invention can also be applied in a continuous performance whereby each paper can be printed upon successively several times, such as for colour printing. In the drawing two printing stations are illustrated by printing or offset cylinders 201 and 202 and corresponding impression cylinders 203 and 204, respectively. The paper transport takes place by means of grippers 205 attached at intervals on endless chains 211, one at each end of the cylinders, the chains being supported by front chain wheels 206 and rear chain wheels 207 as well as wheels 208 about the delivery pile 210 and wheels 209 for guiding the chains below the impression cylinders 203 and 204. Between the chains support tables 213 and 214 are arranged between the cylinder couples and at the delivery side of the last couple, respectively to support the paper sheets 212.

Suction nozzles 216 are provided for lifting papers from the feed pile 217 to the paper forwarding belt 218 perpetually rotating about the rolls 219 and 220. From the belt 218 the paper sheet 212 is lifted by suction nozzles 221 and brought into the mouth of the gripper 205 just advanced into seizing position, the gripper being opened by some adequate mechanism diagrammatically illustrated by member 222. The gripper seizes the paper just as the suction nozzles 221 release it and then pulls it between the first cylinder couple 201, 203 at the exact peripheral speed of the printing surface thereof. The gripper passes then the sheet to the next cylinder couple 202, 204, the working surfaces of which just meet when the gripper has brought the paper in proper printing position and is moving through the gap formed by the depressed portions of the cylinders. In the same way the paper can be passed through more couples of printing cylinders. At last the gripper reaches the gripper operating member 223 which opens the jaws of the gripper and causes the gripper to release the paper 212 which will then fall down on the delivery pile 210 through the free space between the chains 211.

The gripper will then pass about chain wheels 206 and guide wheels 208. It is necessary to arrange such great an interval between the grippers that no gripper will occupy the space over pile 210 when a paper sheet is released and falls down. After the rear guide wheel 208 the gripper passes down below the impression cylinders by the aid of guide wheels 209 so that the gripper can return for another paper transporting cycle.

In the two-speed gears described above a cog wheel is engaged periodically with a cog segment of different peripheral velocity to that of the cog wheel. In order to facilitate the engagement abutments may be so provided in either of the cooperating wheel and segment as to cause engagement between these abutments just prior to the engagement of the cog wheel and cog segment so that the latter ones will engage more smoothly. Such abutments may be in the form of pre-cogs, possibly attached to the side walls of said wheel and segment. The abutments should preferably be easily replaceable since they may be worn out long before the gears proper.

Though having been described with particular reference to embodiments comprising a more rapid return of the grippers than the advance thereof, the machine may be provided with grippers returning at the same speed as that by which they are advanced. But in such a case the printing surface cannot be so extended peripherally as in the embodiment particularly described. It is to be noted that the grippers have usually to be advanced somewhat beyond the delivery pile to give the released paper time to fall down sufficiently for not obstructing the path of the returning grippers. This makes the use of speedier return more imperative.

It has been stated above and in the claims that the gripper advances from and returns to the inlet side of the cylinders but it is to be understood that the claims shall be construed so as also to comprise the equivalent case where the grippers do not actually pass over the centre of the gap to receive the paper.

What is claimed is:

1. A rotary printing machine comprising, a printing cylinder having along its periphery a printing surface and a depressed surface of less radius than said printing surface, an impression cylinder having along its periphery an impression surface and a depressed surface of less radius than said impression surface, said cylinders being arranged to rotate unidirectionally at a constant speed in printing relationship to each other so as to form an inlet side for paper to be printed where the cylinder surfaces approach each other during rotation and an outlet side where the cylinder surfaces leave each other during rotation, said depressed surfaces registering during the rotation of the cylinders so that in successive periods an open gap is formed between the cylinders, at least one gripper for paper sheets, a carrier for said gripper arranged to advance said gripper from a paper seizing position between said cylinders near the common plane through the axes of said cylinders through said gap to a paper releasing position on said outlet side at a velocity equal to the peripheral velocity of said printing surface for a length from said common plane at least as great as the peripheral length of the printing surface, and thereafter to return the gripper to said paper seizing position first gripper operating means causing said gripper to seize, while said open gap prevails, a paper sheet supplied at said inlet side, second gripper operating means causing said gripper to release the paper sheet at said outlet side, said second gripper operating means being located so as to operate the gripper at a distance from said common plane greater than the peripheral length of said printing surface.

2. A rotary printing machine comprising, a printing cylinder having along its periphery a printing surface and a depressed surface of less radius than said printing surface, an impression cylinder having along its periphery an impression surface and a depressed surface of less radius than said impression surface, said impression surface being equal to said printing surface in radius, said cylinders being arranged to rotate unidirectionally at equal constant speed in printing relationship to each other so as to form an inlet side for paper to be printed where the cylinder surfaces approach each other during rotation and an outlet side where the cylinder surfaces leave each other during rotation, said depressed surfaces registering during the rotation of the cylinders so that in successive periods an open gap is formed between the cylinders, at least one gripper for paper sheets, a carrier for said gripper arranged to advance said gripper from a paper seizing position between said cylinders near the common plane through the axes of said cylinders through said gap to a paper releasing position on said outlet side at a velocity equal to the peripheral velocity of said printing surface for a length from said common plane at least as great as the peripheral length of the printing surface, and thereafter to return the gripper to said paper seizing position, first gripper operating means causing said gripper to seize, while said open gap prevails, a paper sheet supplied at said inlet side, second gripper operating means causing said gripper to release the paper sheet at said outlet side, said second gripper operating means being located so as to operate the gripper at a distance from said common plane greater than the peripheral length of said printing surface.

3. A rotary printing machine comprising, a printing cylinder having along its periphery a printing surface and a depressed surface of less radius than said printing surface, an impression cylinder having along its periphery an impression surface and a depressed surface of less radius than said impression surface, said cylinders being arranged to rotate unidirectionally in printing relationship to each other so as to form an inlet side for paper to be printed where the cylinder surfaces approach each other during rotation and an outlet side where the cylinder surfaces leave each other during rotation, said depressed surfaces registering during the rotation of the cylinders so that in successive periods an open gap is formed between the cylinders, at least one gripper for paper sheets, a carrier for said gripper arranged to advance said gripper from a paper seizing position between said cylinders near the common plane through the axes of said cylinders through said gap to a paper releasing position on said outlet side at a velocity equal to the peripheral velocity of said printing surface for a length from said common plane at least as great as the peripheral length of the printing surface, and thereafter at an increased speed to return said gripper to said inlet side through the gap, first gripper operating means causing said gripper to seize, while said open gap prevails, a paper sheet supplied at said inlet side, second gripper operating means causing said gripper to release the paper sheet at said outlet side, said second gripper operating means being located so as to operate the gripper at a distance from said common plane greater than the peripheral length of said printing surface.

4. A rotary printing machine comprising, a printing cylinder having along its periphery a printing surface and a depressed surface of less radius than said printing surface, an impression cylinder having along its periphery an impression surface and a depressed surface of less radius than said impression surface, said cylinders being arranged to rotate unidirectionally at a constant speed in printing relationship to each other so as to form an inlet side for paper to be printed where the cylinder surfaces approach each other during rotation and an outlet side where the cylinder surfaces leave each other during rotation, said depressed surfaces registering during the rotation of the cylinders so that in successive periods an open gap is formed between the cylinders, at least one gripper for paper sheets, a carriage for said gripper arranged to advance said gripper from a paper seizing position between said cylinders near the common plane through the axes of said cylinders through said gap to a paper releasing position on said outlet side at a velocity equal to the peripheral velocity of said printing surface for a length from said common plane at least as great as the peripheral length of the printing surface and to return said gripper to said inlet side through the gap, the return velocity being at least as many times greater than the advance velocity as the peripheral length of said printing surface is greater than the peripheral length of the depressed surface of said printing cylinder at the radius of said printing surface.

5. A rotary printing machine comprising, a printing cylinder having along its periphery a printing surface and a depressed surface of less radius than said printing surface, an impression cylinder having along its periphery an impression surface and a depressed surface of less radius than said impression surface, said cylinders being arranged to rotate unidirectionally at a constant speed in printing relationship to each other so as to form an inlet side for paper to be printed where the cylinder surfaces approach each other during rotation and an outlet side where the cylinder surfaces leave each other during rotation, said depressed surfaces registering during the rotation of the cylinders so that in successive periods an open gap is formed between the cylinders, at least one gripper for paper sheets, a carriage for said gripper arranged to advance said gripper from a paper seizing position between said cylinders near the common plane through the axes of said cylinders through said gap to a paper releasing position on said outlet side at a velocity equal to the peripheral velocity of said printing surface for a length at least as great as the peripheral length of the printing surface and to return said gripper to said inlet side through the gap, said gripper comprising upper and lower jaws forming a mouth, gripping ends at the extremes of said grippers arranged to engage each other, in closed position of said mouth substantially no portion of said jaws being located below a horizontal plane lying immediately below the gripping end of said lower jaw.

6. In a rotary printing machine as defined in claim 1, wherein said carrier is a carriage, a spring urging said carriage to return to said inlet side, a carriage advancing wheel mounted on a shaft arranged to rotate at a peripheral velocity equal to that of said printing surface, a wire secured with its one end to the periphery of said wheel and with its other end to said carriage so as upon rotation of said wheel to pull the carriage against the power of said spring, driver means connecting said wheel to said shaft, releasing means for disconnecting said driver means at the advanced position of said gripper.

7. In a rotary printing machine as defined in claim 1, wherein said carrier is a carriage, a spring urging said carriage to return to said inlet side, a carriage advancing wheel mounted on a shaft, the radius of said wheel being equal to that of said printing surface, a wire secured with its one end to the periphery of said wheel and with its other end to said carriage so as upon rotation of said wheel to pull the carriage against the power of said spring.

8. A rotary printing machine as defined in claim 1, wherein there is provided a sun and planet gear arranged to advance said gripper from said inlet side through said gap to said outlet side at a velocity equal to the peripheral velocity of the printing surface for a length at least as great as the peripheral length of the printing surface and thereafter at an increased speed to return said gripper to said inlet side through the gap to complete one cycle, the return velocity being at least as many times greater than the advance velocity as the peripheral length of said printing surface is greater than the peripheral length of the depressed surface of said printing cylinder at the radius of said printing surface.

9. A rotary printing machine as defined in claim 9, wherein said sun and planet gear comprises a driving shaft, an arm secured radially to said shaft, a pin mounted on said arm parallel to said shaft, a planetary cog wheel rotatably mounted on said pin, a cog ring mounted to rotate coaxially to said driving shaft and adapted to engage said planetary cog wheel, motion transmitting means connected to said cog wheel coaxially secured to said planetary cog wheel, a cog segment stationarily arranged along a portion of the circular path of said driver cog wheel and so as to engage the latter in periods, thereby causing said cog wheels to rotate about said pin during said periods, and arresting means for keeping said driver cog wheel immovable relative to said pin when out of engagement with said cog segment.

References Cited in the file of this patent

UNITED STATES PATENTS

| | | |
|---|---|---|
| 709,885 | Dick | Sept. 30, 1902 |
| 1,107,613 | Huffman | Aug. 18, 1914 |
| 1,228,933 | Leilich et al. | June 5, 1917 |
| 1,280,702 | Friess | Oct. 8, 1918 |
| 1,447,334 | Bacon | Mar. 6, 1923 |
| 1,815,419 | Praetzel | July 21, 1931 |
| 1,849,219 | Belluche | Mar. 15, 1932 |
| 1,956,699 | Russell | May 1, 1934 |
| 2,231,914 | Huck | Feb. 18, 1941 |
| 2,286,032 | Eckard | June 9, 1942 |
| 2,439,070 | Bailey et al. | Apr. 6, 1948 |
| 2,551,060 | Simmons | May 1, 1951 |
| 2,590,179 | Johnson | May 25, 1952 |

FOREIGN PATENTS

| | | |
|---|---|---|
| 100,527 | Germany | Dec. 29, 1898 |
| 280,921 | Germany | Dec. 2, 1914 |